(12) United States Patent
Revheim

(10) Patent No.: US 10,570,707 B2
(45) Date of Patent: Feb. 25, 2020

(54) METHOD AND SYSTEM FOR ARCHIVING A PLURALITY OF INDIVIDUAL DATA FILES FROM AN OIL WELL IN AN INDEXED MANNER

(71) Applicant: Exebenus AS, Sandnes (NO)

(72) Inventor: Olav Revheim, Sandnes (NO)

(73) Assignee: Exebenus AS, Sandnes (NO)

( * ) Notice: Subject to any disclaimer, the term of this patent is extended or adjusted under 35 U.S.C. 154(b) by 0 days.

(21) Appl. No.: 16/229,010

(22) Filed: Dec. 21, 2018

(65) Prior Publication Data

US 2019/0195050 A1    Jun. 27, 2019

Related U.S. Application Data

(60) Provisional application No. 62/609,005, filed on Dec. 21, 2017.

(51) Int. Cl.
*E21B 41/00* (2006.01)
*E21B 49/00* (2006.01)

(52) U.S. Cl.
CPC .......... *E21B 41/0092* (2013.01); *E21B 49/00* (2013.01)

(58) Field of Classification Search
CPC ........ E21B 7/04; E21B 41/00; E21B 41/0092; E21B 43/00; E21B 44/00; E21B 44/005; E21B 45/00; E21B 47/00; E21B 47/024; E21B 47/04; E21B 49/00; G01V 1/20; G06Q 10/0633; G06Q 30/02; G06Q 50/02; G06Q 50/00

USPC ............... 340/853.1, 854.4; 702/6
See application file for complete search history.

(56) References Cited

U.S. PATENT DOCUMENTS

| | | | | |
|---|---|---|---|---|
| 6,370,547 | B1* | 4/2002 | Eftink | G06Q 10/06 |
| 7,283,061 | B1* | 10/2007 | Snider | E21B 17/006 |
| | | | | 166/254.2 |
| 10,030,499 | B2* | 7/2018 | Johnston | E21B 44/00 |
| 2001/0042642 | A1* | 11/2001 | King | E21B 7/00 |
| | | | | 175/40 |
| 2005/0192855 | A1* | 9/2005 | Chitty | E21B 43/00 |
| | | | | 705/1.1 |
| 2006/0195646 | A1* | 8/2006 | Marsh | G06F 16/24568 |
| | | | | 711/100 |
| 2015/0234081 | A1* | 8/2015 | Maus | G01V 3/40 |
| | | | | 702/6 |
| 2016/0053605 | A1* | 2/2016 | Abbassian | E21B 44/00 |
| | | | | 702/6 |
| 2016/0092482 | A1* | 3/2016 | Haq | G06Q 10/06 |
| | | | | 707/754 |
| 2019/0003297 | A1* | 1/2019 | Brannigan | E21B 7/00 |

* cited by examiner

*Primary Examiner* — Stephen R Burgdorf
(74) *Attorney, Agent, or Firm* — Casimir Jones S.C.; JOhn Mitchell Jones

(57) ABSTRACT

The invention describes a method for creating a digital archive for information generated in drilling and well operations, as well as for planning such operations. The invention further describes a system for linking, storing and accessing the information in a data store, and graphical user interfaces enabling users to accessing information made available in the system. The described system allows internet based (cloud), thus allowing users to access information from different physical and virtual location.

17 Claims, 19 Drawing Sheets

FIG. 9

| | | Detailed Running Procedure | | |
|---|---|---|---|---|
| Rig | ABC | DRP 6 | Rev. | 0 |
| Well | C-15 | Install Time lock plug in 10 ¾" liner | Date | 05.06.2014 |
| | | | Status | Final |

Approved:

Distribution:

Administration:

1.0 Tool Box Safety Points

- Toolbox meeting on rig floor with involved personnel as required.
- Perform the job in correct way first time
- Use A-standard before the operation starts (C & L).
- If plan is not followed - STOP, contact your leader and evaluate.
- All lifting operations to be planned ahead.

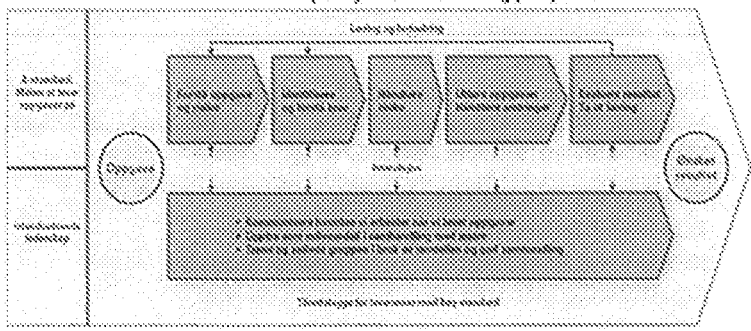

FIG. 11

*Summary Daily Report* 1102 1101

METHOD AND SYSTEM FOR ARCHIVING A PLURALITY OF INDIVIDUAL DATA FILES FROM AN OIL WELL IN AN INDEXED MANNER

FIELD OF THE INVENTION

This invention relates generally to oil and gas well drilling and well operations, including injection and waste wells throughout the lifetime of the well. More specifically, this invention relates to a method and a system for establishing and maintaining a well archive for different kinds of information related to one or more operations in one or more wells throughout and beyond the lifetime of the well. Well operations include, but are not limited to drilling, casing/liner operations, logging, completions, well interventions and plugging and abandonment, whether executed by a drilling rig, snubbing, coiled tubing, wireline units or other methods, or a combination of one or more of these methods, hereafter called unit(s).

BACKGROUND OF THE INVENTION

Drilling and well operations in oil and gas wells are expensive operations that impact the production and production potential of the well. The cost is typically several tens to several hundred thousand dollars per day, and a failed operation may ruin the well's production. These operations are also prone to a high percentage of non-productive time, often in the range of 10 to 20% of the total operation time. Some of this non-productive time also poses risk for injuries, loss of life, and damage to the environment. Historical and archived information is paramount for understanding failures, and forms an essential component of post operation analysis, benchmarking and continuous improvement initiatives, thus contributing to better operations.

SUMMARY OF THE INVENTION

The invention contains a method for creating a well archive by tying information from different sources together via the use of metadata. These sources can be, but are not limited to simulation results, BHA schematics, product data, time and depth based data and reports. The invention further contains a system in which the archived data are connected in a computer system for display in a computer user interface.

Accordingly, in some preferred embodiments, the present invention provides methods for archiving oil well information for an oil well comprising multiple sections, said method comprising: at a central computer server, receiving oil well data for a specific oil well from one or more remote computers/servers located at a site remote from the central server, the oil well data comprising oil well schematics; extracting oil well schematic metadata from the oil well schematics, the oil well schematic metadata comprising one or more of section size, section depth, bit run data and casing run data for each section; creating a well bore unique identifier from the oil well schematic metadata for each section to uniquely identify the wellbore; at the central computer server, receiving well run data; extracting well run metadata from the well run data, the well run metadata comprising one or more of maximum depth for the run, start time for the run, and end time for the run, wherein the well run metadata is associated with the drilling for each section; creating a run unique identifier from the well run metadata to uniquely define each run for the well; receiving additional oil well data files for the well from one or more remote servers, the additional oil well data files selected from the group consisting of oil well schematics, bottom hole assembly data, product technical data, oil well running procedures, drilling simulations, time and depth based sensor data, oil well reports, and combinations thereof; and at the central server, indexing one or more of the additional well data files with metadata comprising one or both of the well bore unique identifier and run unique identifier to provide a database of indexed files associated with one or more oil wells.

In some preferred embodiments, the methods further comprise: at the central computer server, receiving a bottom hole assembly schematic; extracting metadata from the bottom hole assembly schematic comprising equipment type metadata; creating an equipment unique identifier from the equipment type metadata; and at the central server, indexing one or more of the additional well data files with metadata comprising the equipment unique identifier alone or in combination with the well bore unique identifier and run unique identifier to provide a database of indexed files associated with one or more oil wells.

In some preferred embodiments, the methods further comprise: generating a request for metadata via a processor associated with the central server and transmitting the request for metadata to one or more remote servers/computers, wherein the response to the request is indexed within the central server with one or more of the well bore unique identifier, the run unique identifier and the equipment unique identifier. In some preferred embodiments, the responses are selected from the group consisting of daily reports, end of section reports, end of well reports, and end of job reports for interventions.

In some preferred embodiments, the methods further comprise: providing a use interface accessible from a remote location via a web browser, the user interface comprising a search function allowing users to search the database of indexed files associated with one or more oil wells. In some preferred embodiments, upon execution of a search via the search function, wellbores meeting the search criteria are displayed on the search interface. In some preferred embodiments, upon selecting a wellbore displayed on the search interface causes display on the interface, on the same page or in a new well page, of one or more the well schematic, bottom hole assembly schematic, and text description of the section associated with the well and indexed by one or more of the well bore unique identifier, the run unique identifier and the equipment unique identifier. In some preferred embodiments, the display comprises selectable symbols, selection of which by a user causes display of one or more of the well schematic, bottom hole assembly schematic, section description, list of formations penetrated by the well, well reports, time and depth data, and simulation data.

In some preferred embodiments, the methods further comprise: providing an organized archive accessible from the search page via a designated symbol, said organized archive comprising files indexed by one or more of the well bore unique identifier, the run unique identifier and the equipment unique identifier, wherein the archived information is accessed by a first list designating a plurality of regions, each of which is expandable to a second list of fields within the selected region. In some preferred embodiments, the second list of fields within the selected region is expandable to a list of wells drilled in the field. In some preferred embodiments, selection of well from the list of wells drilled in the field causes display on the interface, on the same page or a new well page, of one or more the well schematic, bottom hole assembly schematic, and text description of the section associated with the well and indexed by one or more of the well bore unique identifier, the run unique identifier and the equipment unique identifier. In some preferred embodiments, the display comprises selectable symbols, selection of which by a user causes display of one or more of the well schematic, bottom hole assembly schematic, section description, list of formations penetrated by the well, well reports, time and depth data, and simulation data.

In further preferred embodiments, the present invention provides a non-transitory computer-readable medium having stored thereon computer readable instructions that when executed by a computing device cause the computing device to: receive oil well data for a specific oil well from one or more remote computers/servers located at a site remote from the central server, the oil well data comprising oil well schematics; extract oil well schematic metadata from the oil well schematics, the oil well schematic metadata comprising one or more of section size, section depth, bit run data and casing run data for each section; create a well bore unique identifier from the oil well schematic metadata for each section to uniquely identify the section; receive well run data; extract well run metadata from the well run log, the well run metadata comprising one or more of maximum depth for the run, start time for the run, and end time for the run, wherein the well run metadata is associated with the drilling for each section; create a run unique identifier from the well run metadata to uniquely define each run for the well; receive additional oil well data files for the well from one or more remote servers, the additional oil well data files selected from the group consisting of oil well schematics, bottom hole assembly data, product technical data, oil well running procedures, drilling simulations, time and depth based sensor data, oil well reports, and combinations thereof; and index one or more of the additional well data files with metadata comprising one or both of the well bore unique identifier and run unique identifier to provide a database of indexed files associated with one or more oil wells.

In some preferred embodiments, the non-transitory computer-readable medium further has stored thereon computer readable instructions that when executed by a computing device cause the computing device to: receive a bottom hole assembly schematic; extract metadata from the bottom hole assembly schematic comprising equipment type metadata; create an equipment unique identifier from the equipment type metadata; and index one or more of the additional well data files with metadata comprising the equipment unique identifier alone or in combination with the well bore unique identifier and run unique identifier to provide a database of indexed files associated with one or more oil wells.

In some preferred embodiments, the non-transitory computer-readable medium further has stored thereon computer readable instructions that when executed by a computing device cause the computing device to generate a request via a processor associated the with the central server and transmitting the request to one or more remote servers/computers, wherein the response is indexed and stored on the central server with one or more of the well bore unique identifier, the run unique identifier and the equipment unique identifier. In some preferred embodiments, the responses are selected from the group consisting of daily reports, end of section reports, end of well reports, and end of job reports for well operations.

In some preferred embodiments, the non-transitory computer-readable medium further has stored thereon computer readable instructions that when executed by a computing device cause the computing device to provide a user interface accessible from a remote location via a web browser, the user interface comprising a search function allowing users to search the database of indexed files associated with one or more oil wells. In some preferred embodiments, upon execution of a search via the search function, wellbores meeting the search criteria are displayed on the search interface. In some preferred embodiments, upon selecting a wellbore displayed on the search interface causes display on the interface, on the same page or in a new well page, of one or more the well schematic, bottom hole assembly schematic, and text description of the section associated with the well and indexed by one or more of the well bore unique identifier, the run unique identifier and the equipment unique identifier. In some preferred embodiments, the display comprises selectable symbols, selection of which by a user causes display of one or more of the well schematic, bottom hole assembly schematic, section description, list of formations penetrated by the well, well reports, time and depth data, and simulation data.

In some preferred embodiments, the non-transitory computer-readable medium further has stored thereon computer readable instructions that when executed by a computing device cause the computing device to provide an organized archive accessible from the search page via a designated symbol, said organized archive comprising files indexed by one or more of the well bore unique identifier, the run unique identifier and the equipment unique identifier, wherein the archived information is accessed by a first list designating a plurality of regions, each of which is expandable to a second list of fields within the selected region. In some preferred embodiments, the second list of fields within the selected region is expandable to a list of wells drilled in the field. In some preferred embodiments, selection of well from the list of wells drilled in the field causes display on the interface, on the same page or a new well page, of one or more the well schematic, bottom hole assembly schematic, and text description of the section associated with the well and indexed by one or more of the well bore unique identifier, the run unique identifier and the equipment unique identifier. In some preferred embodiments, the display comprises selectable symbols, selection of which by a user causes display of one or more of the well schematic, bottom hole assembly schematic, section description, list of formations penetrated by the well, well reports, time and depth data, and simulation data.

In still further preferred embodiments, the present invention provides computing devices comprising a computer processor and the non-transitory computer readable medium of any one as described above operably linked to the computer processor so that the processor executes the instructions contained on the non-transitory computer readable medium.

In still other preferred embodiments, the present invention provides systems comprising: a database comprising a plurality of oil well data files from remote sources, the oil well data files indexed with metadata selected from the group consisting of: a well bore unique identifier created from oil well schematic metadata comprising one or more of section size, section depth, bit run data and casing run data for each section, a run unique identifier created from well run metadata comprising one or more of maximum depth for the run, start time for the run, and end time for the run, wherein the well run metadata is associated with the drilling for each section, an equipment unique identifier created from equipment type metadata from a bottom hole assembly schematic, and combinations thereof; so that individual oil well data files selected from the group consisting of oil well schematics, bottom hole assembly data, product technical data, oil well running procedures, drilling simulations, time and depth based sensor data, oil well reports, and combinations thereof from a particular well are uniquely indexed to the particular well based on one or more of the well bore unique identifier, run unique identifier and equipment unique identifier; and a user interface accessible from a remote location via a web browser, the user interface comprising a search function allowing users to search the database of indexed files associated with one or more oil wells.

In some preferred embodiments, upon execution of a search via the search function, wellbores meeting the search criteria are displayed on the search interface. In some preferred embodiments, upon selecting a wellbore displayed on the search interface causes display on the interface, on the same page or in a new well page, of one or more the well schematic, bottom hole assembly schematic, and text description of the section associated with the well and indexed by one or more of the well bore unique identifier, the run unique identifier and the equipment unique identifier. In some preferred embodiments, the display comprises selectable symbols, selection of which by a user causes display of one or more of the well schematic, bottom hole assembly schematic, section description, list of formations penetrated by the well, well reports, time and depth data, and simulation data.

In some preferred embodiments, the systems further comprise an organized archive accessible from the search page via a designated symbol, said organized archive comprising files indexed by one or more of the well bore unique identifier, the run unique identifier and the equipment unique identifier, wherein the archived information is accessed by a first list designating a plurality of regions, each of which is expandable to a second list of fields within the selected region. In some preferred embodiments, the second list of fields within the selected region is expandable to a list of wells drilled in the field. In some preferred embodiments, selection of well from the list of wells drilled in the field causes display on the interface, on the same page or a new well page, of one or more the well schematic, bottom hole assembly schematic, and text description of the section associated with the well and indexed by one or more of the well bore unique identifier, the run unique identifier and the equipment unique identifier. In some preferred embodiments, the display comprises selectable symbols, selection of which by a user causes display of one or more of the well schematic, bottom hole assembly schematic, section description, list of formations penetrated by the well, well reports, time and depth data, and simulation data.

In some preferred embodiments, the systems further comprise a service layer, wherein the service layer comprises a server/computer that: receives oil well data for a specific oil well from one or more remote computers/servers located at a site remote from the central server, the oil well data comprising oil well schematics; extracts oil well schematic metadata from the oil well schematics, the oil well schematic metadata comprising one or more of section size, section depth, bit run data and casing run data for each section; creates a well bore unique identifier from the oil well schematic metadata for each section to uniquely identify the section; receives well run data; extracts well run metadata from the well run data, the well run metadata comprising one or more of maximum depth for the run, start time for the run, and end time for the run, wherein the well run metadata is associated with the drilling for each section; creates a run unique identifier from the well run metadata to uniquely define each run for the well; receives additional oil well data files for the well from one or more remote servers, the additional oil well data files selected from the group consisting of oil well schematics, bottom hole assembly data, product technical data, oil well running procedures, drilling simulations, time and depth based sensor data, oil well reports, and combinations thereof; and indexes one or more of the additional well data files with metadata comprising one or both of the well bore unique identifier and run unique identifier to provide a database of indexed files associated with one or more oil wells.

In some preferred embodiments, the service layer further: receives a bottom hole assembly schematic; extracts metadata from the bottom hole assembly schematic comprising equipment type metadata; creates an equipment unique identifier from the equipment type metadata; and indexes one or more of the additional well data files with metadata comprising the equipment unique identifier alone or in combination with the well bore unique identifier and run unique identifier to provide a database of indexed files associated with one or more oil wells.

DESCRIPTION OF THE FIGURES

FIG. 9 is a depiction of an exemplary operating procedure file.

FIG. 11 is a depiction of reports associated with an oil well.

DETAILED DESCRIPTION OF THE INVENTION

The present invention is applicable to oil and gas well drilling and well operations, including injection and waste wells throughout the lifetime of the well. More specifically, the present invention provides methods and systems for establishing and maintaining a well archive for different kinds of information related to one or more operations in one or more wells throughout and beyond the lifetime of the well. Well operations include, but are not limited to drilling, casing/liner operations, logging, completions, well interventions and plugging and abandonment, whether executed by a drilling rig, snubbing, coiled tubing, wireline units or other methods, or a combination of one or more of these methods, hereafter called unit(s).

Due to the cost and complexity of well operations, they are thoroughly planned, documented and archived. Sensor data from the units may also be archived for future use. The documentation and sensor data are used for documenting 1) the equipment and operations that took place in the well for further reference and study, 2) the current state of the well as input for later operations, and 3) post-operation analysis and learning to optimize future operations.

Figure 1:
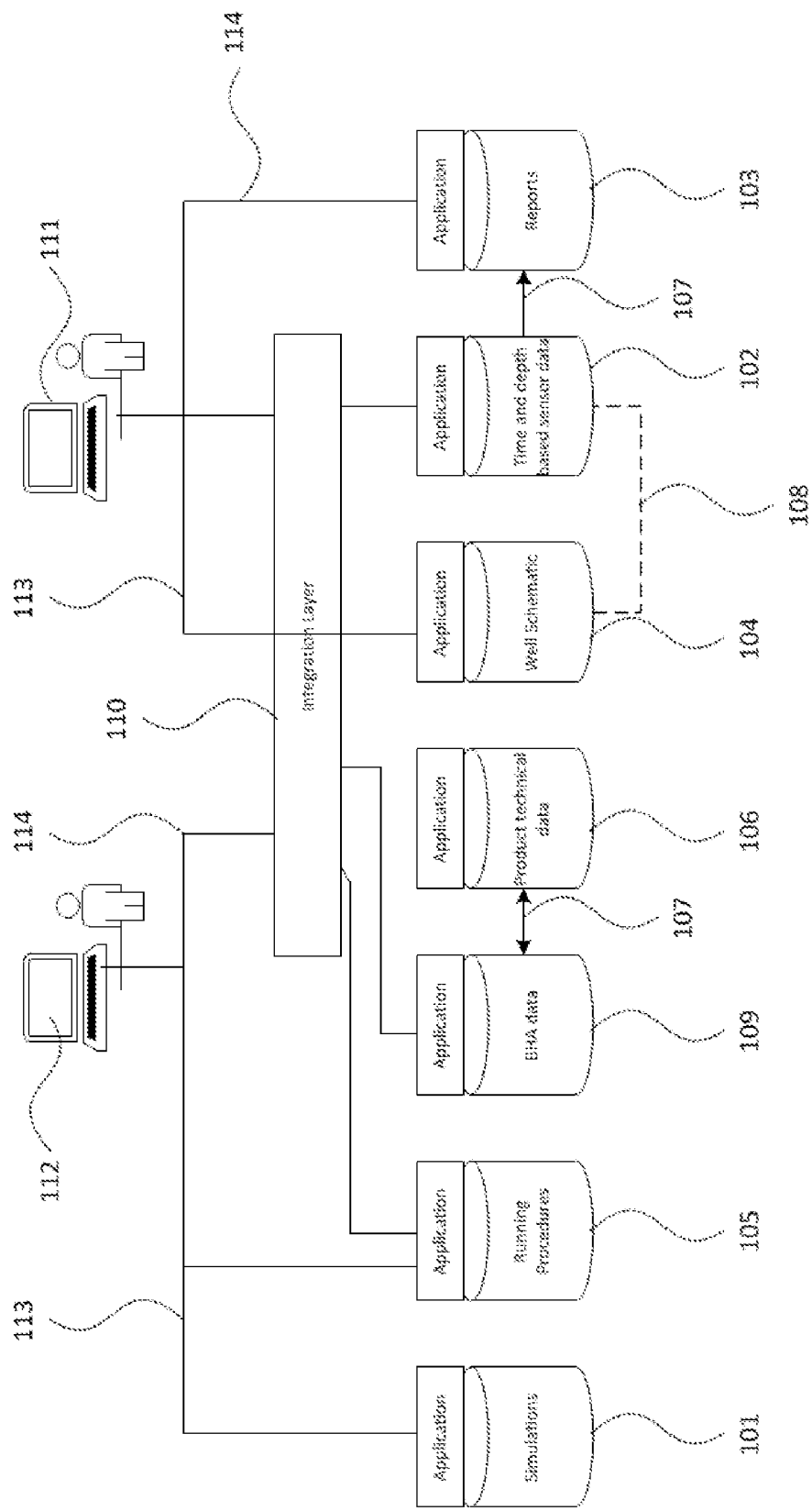
FIG. 1 is a schematic diagram of showing different sources of information and data that are relevant to oil well operations.

Information that is currently archived in the field of the invention may include but is not limited to the types of data illustrated in FIG. 1. As shown in FIG. 1, this information includes pre-operation simulations and model 101, plans and operational procedures, often called "running procedures" 105, data on the equipment run in the well, including the configuration of the equipment (Bottom Hole Assembly (BHA)) and technical data on the products 106, an overview of the state of the well and the equipment installed in the well, typically called a well schematic 104, time and depth based sensor data from the operations 102 and different reports, including daily reports from the operations, deviation reports, end of operation reports, HSE reports and the like 103. These reports are stored electronically, in individual data stores. Personnel involved in the operations may access the information via computers 111 and 112 where each person, here represented by the computers 111 and 112 respectively, may access only parts of the data. The different kinds of information are generated, stored and accessed via software programs, applications connected with the respective data stores 101, 102, 103, 104, 105, and 106. Such applications may include EDM or Drilling office for simulations, WITSML servers for time and depth data, Microsoft Excel, Word or more specialized applications for running procedures, BHA Data and well schematics. A multitude of different applications are used for different reports, including Microsoft word, stored as PDFs and more structured reports in the form of XML reports.

Some companies have integrated parts of their archives, fully 107 or partly 108 on the data store level, and some have an integration layer 110 on top of the data stores, either by using data warehouses, such as Biztalk, or at the user interface level via systems like Sharepoint, or a combination of these. The user may access the individual applications directly or via the integration level 113 and 114.

Figure 2:
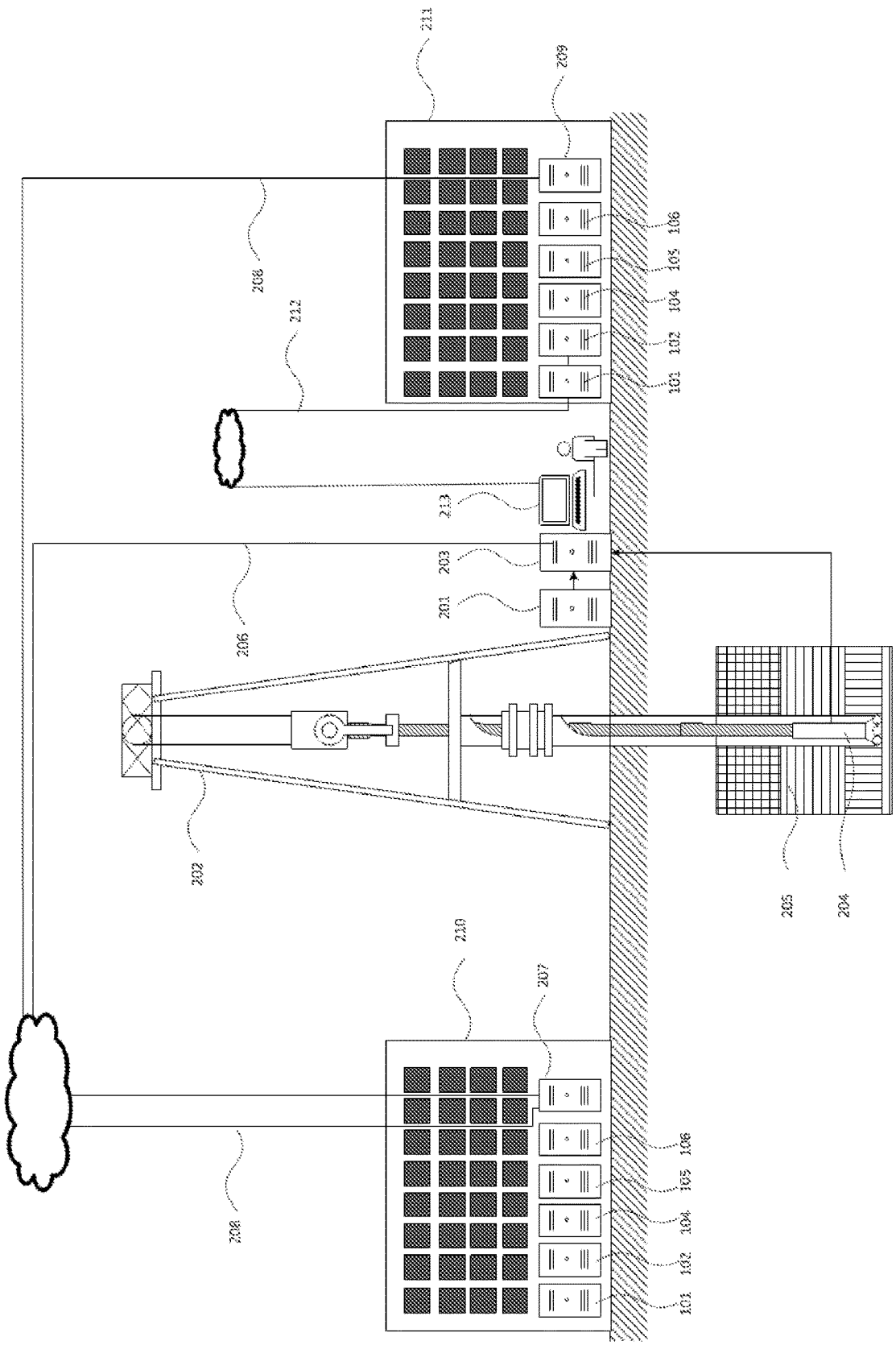
FIG. 2 is a schematic diagram of a drilling rig with a computerized control system.

Multiple companies are normally involved in well operations. This means that the information types addressed above are generated, used and stored by multiple persons belonging to multiple companies. Referring to FIG. 2, a unit, exemplified here with a drilling rig, has a computerized control system 201 that controls the drilling rig 202 and samples and stores sensor data in the control system computer system 201. Some of these sensor data are distributed to a service company data system 203, which also may gather sensor data from the BHA 204 relating to the operations and also possibly the rock formations 205. These sensor data are considered time and depth based sensor data (see item 102 in FIG. 1). These data are typically transferred to a service company office 210 location via internet 206 where they are stored in a data storage system 207 similar to the system describe in FIG. 1. These data may or may not be transferred via internet 208 to a data system 209 at an operator office location 211. The rig site personnel of the operator normally have access to operator data systems from computers 213 that are connected via internet 212 to the office 211. Similar information generation, sharing and storage also apply for simulation 101, reports 102, well schematics 104, running procedures 105 and BHA data 106, as indicated in FIG. 1. The end result of the current practice is that historical information is stored and often duplicated in different data stores in different companies.

Industry studies show that around 50% of non-conformances recorded in relation to well operations are due to poor information transfer and inadequate use of known information. Thus, there is a need in the art for improved well archiving systems and methods, which are disclosed in detail in the following description.

Figure 3:
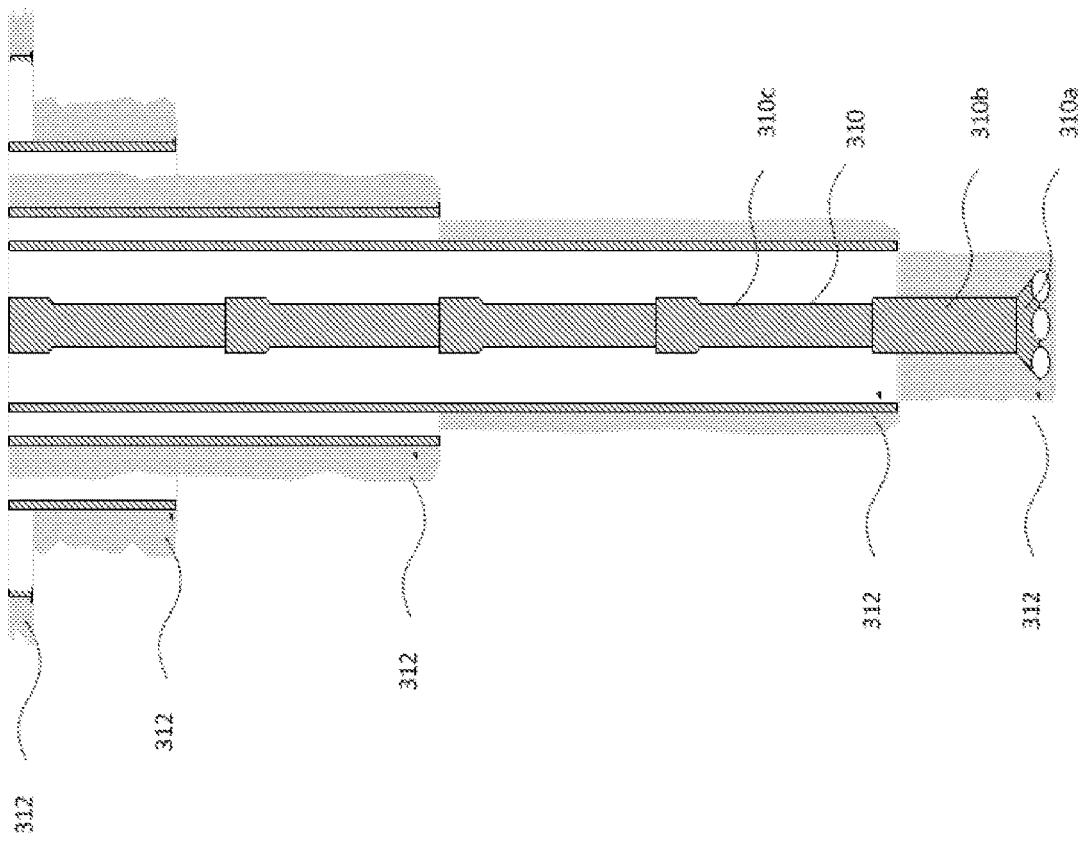
FIGS. 3A and 3B provide a diagram of sections and runs in a well (FIG. 3A) and a well schematic diagram (FIG. 3B).

Referring to FIG. 3A, the construction of a well and the subsequent well operations are normally very structured. Each well/wellbore 313/314 belongs to a field/lease/license or the like 315, which in turn is part of a geographical region 316. Each field/lease/license 315 may contain one or more uniquely named wells 314, and each well may contain one or more uniquely named wellbores 311. To secure wellbore stability, the hole is drilled to a certain depth before it is isolated with a steel casing that will normally be cemented in place. Each such part of a wellbore is a section 312. Thereafter a new, smaller hole is drilled and the process is normally repeated multiple times before the well has reached its total depth. Each section is created, secured and maintained via one or more runs 313. A run is the execution of certain operations in a wellbore at one or more depths with the intention to alter the state of the well, whether these operations are related to drilling new hole, securing or maintaining a section, prepare the well for production (complete), maintain or plug and abandon the well.

Each run is performed by a set of tools 310 (BHA and sub-assemblies) that are included in the run for a purpose. Each of these tools 310a, 310b and 310c respectively, are identified via a unique product description, and/or product or item number and a serial number.

Referring to FIG. 3B, the sections 312 and sometimes runs 310 are normally presented in a graphical representation, termed a well schematic.

The present invention provides a novel method of gathering, linking, archive and make available information (e.g., such as the information described in relation to FIG. 1), a computer system for managing the method and a user interface that enables engineers and other users to access the information, and user interfaces enabling users to easily find and access archived information.

Method

Figure 4:
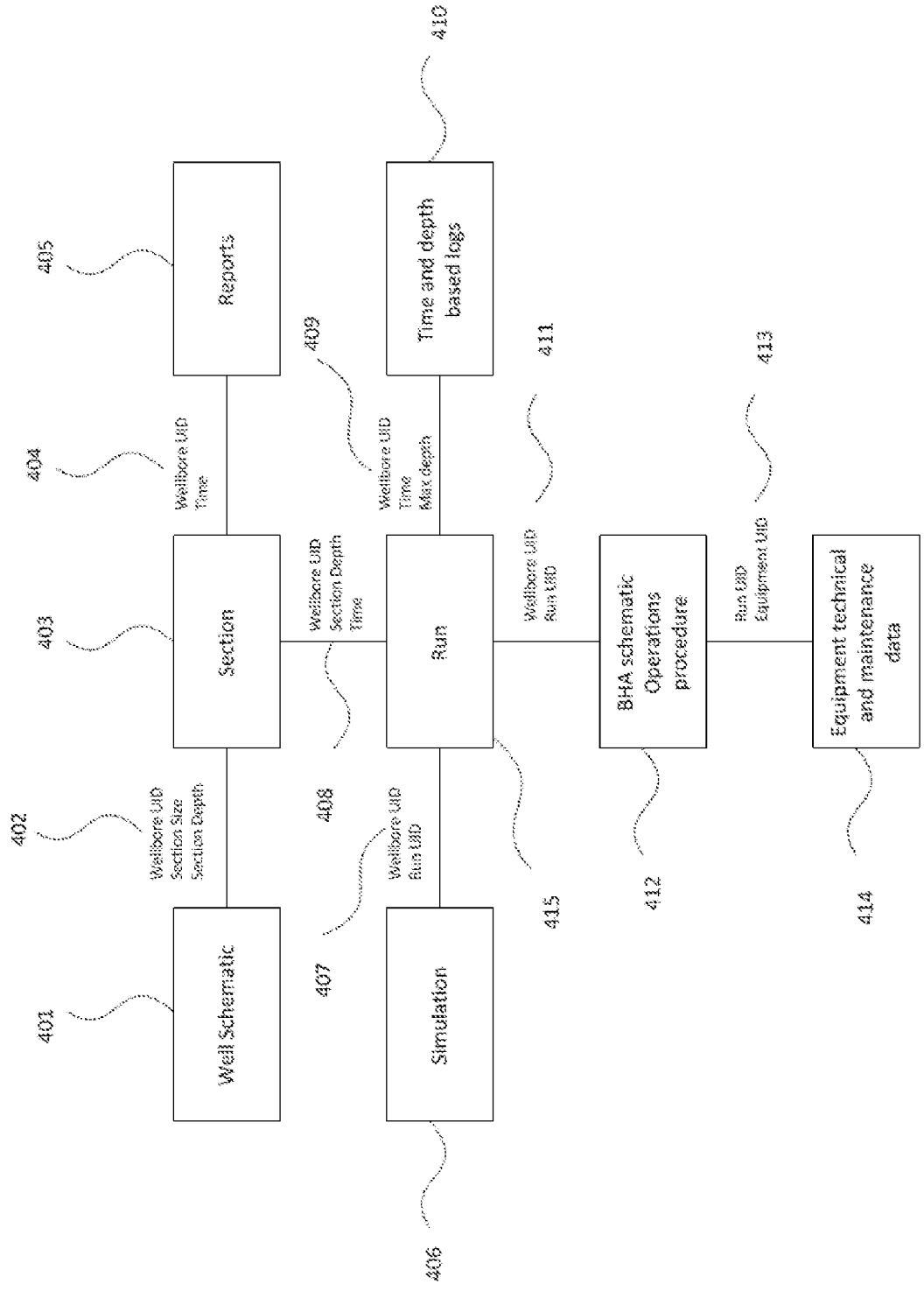
FIG. 4 is chart showing linkage of sources of information related to an oil well to metadata.

In some preferred embodiments, the methods of the present invention link sources of information together via metadata. This linkage is depicted schematically in FIG. 4. Referring to FIG. 4, based on the well schematic 401 a linkage to other well data is established as depicted. In some preferred embodiments, the core metadata extracted from the well schematic comprises one or more of wellbore unique identifier (UID), which is a unique name set by the owner of the wellbore. The schematic is based on the one or both of the bit run data and casing run data associated with a particular section, section size and section depth 402. In some preferred embodiments, the methods and systems of the present invention utilize these metadata to uniquely define each section 403. In additional preferred embodiments, for each section 403, time and depth based logs 410 are used to identify the runs 415 used to create, secure and maintain each section 403. In preferred embodiments, one or more of the wellbore UID, maximum depth for each run, and the start and end time, alone or together with the max depth of the section, are used to uniquely identify the start and end time, as well as depth for each run associated with the section 403. In preferred embodiments, this information is utilized to create a run UID defined by its start and end time and maximum depth. In some preferred embodiments, the start and end time for the section 403, together with the wellbore UID 404 is used to identify, link or index daily reports 405 associated with the section 403. In some preferred embodiments, the run UID and wellbore UID 407 and 411 are used to link or index the BHA schematic and/or operating procedures 412 and any simulation(s) 406 performed for the specific run. In some preferred embodiments, equipment UIDs are provided for specific equipment used in the well, for example the BHA. Equipment UIDs are created from, for example, part or catalog numbers or other unique identifiers related to the equipment. In some preferred embodiments, run UID's and/or equipment UID's 413 contained within the BHA schematic are used to link, for example, equipment technical and maintenance records 414 to the BHA schematic and hence also the run. In some preferred embodiments, formation tops 416 are identified via measured or true vertical depth, which can be retrieved from the depth logs or calculated via the known "minimum curvature method" and the wellbore UID. Each formation is identified by a name 417.

Figure 5:
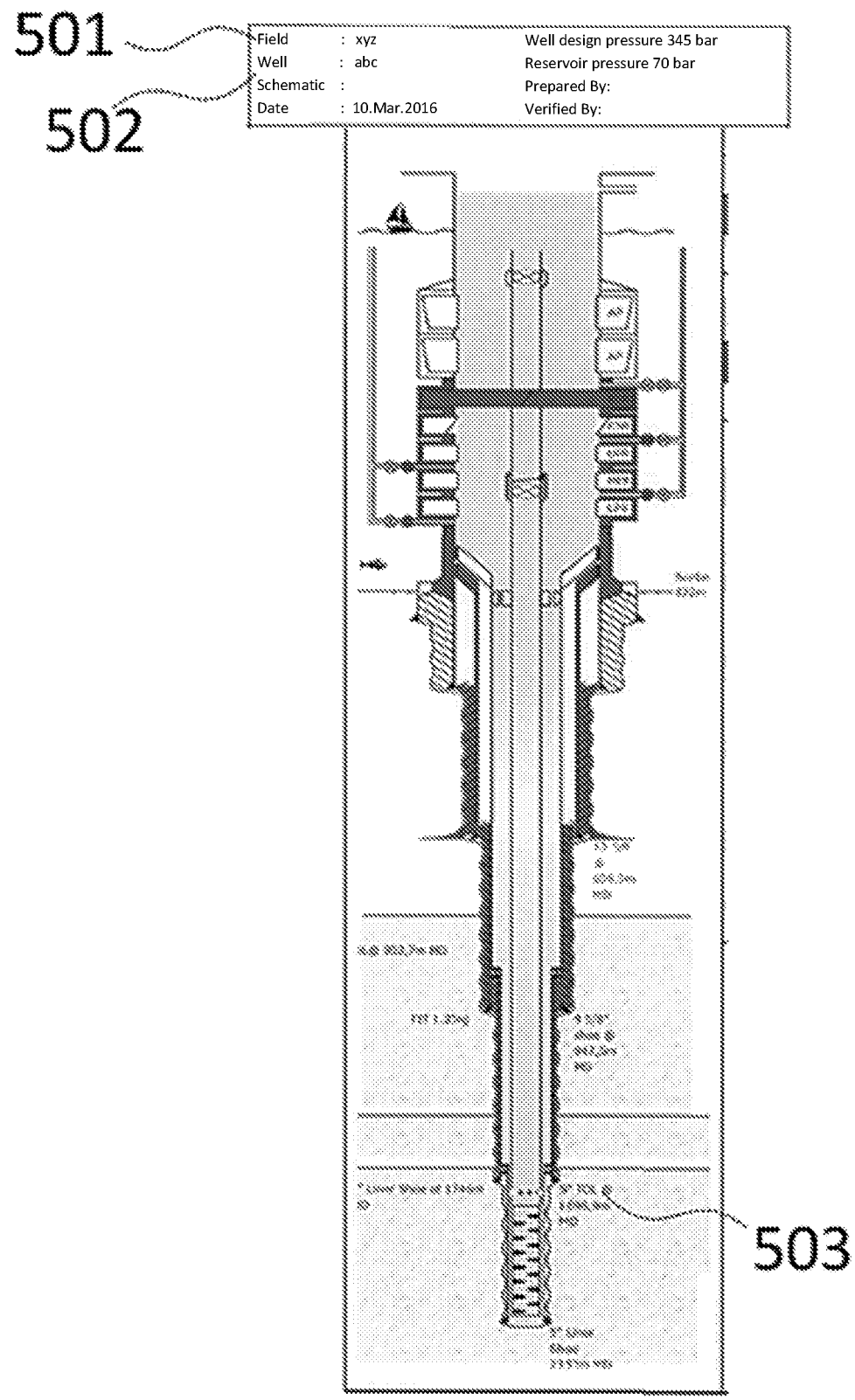
FIG. 5 is an oil well schematic diagram.

A well schematic is presented in FIG. 5. A well schematic is a graphical representation of the wellbore design, identifying the field 501, wellbore name 502, the sections size and maximum depth 503 as a minimum. Thus, in preferred embodiments, via application of the present methods and systems, all sections and their maximum depth are defined and associated with the wellbore name. Furthermore, other data on equipment installed in the well will be included.

Figure 6:
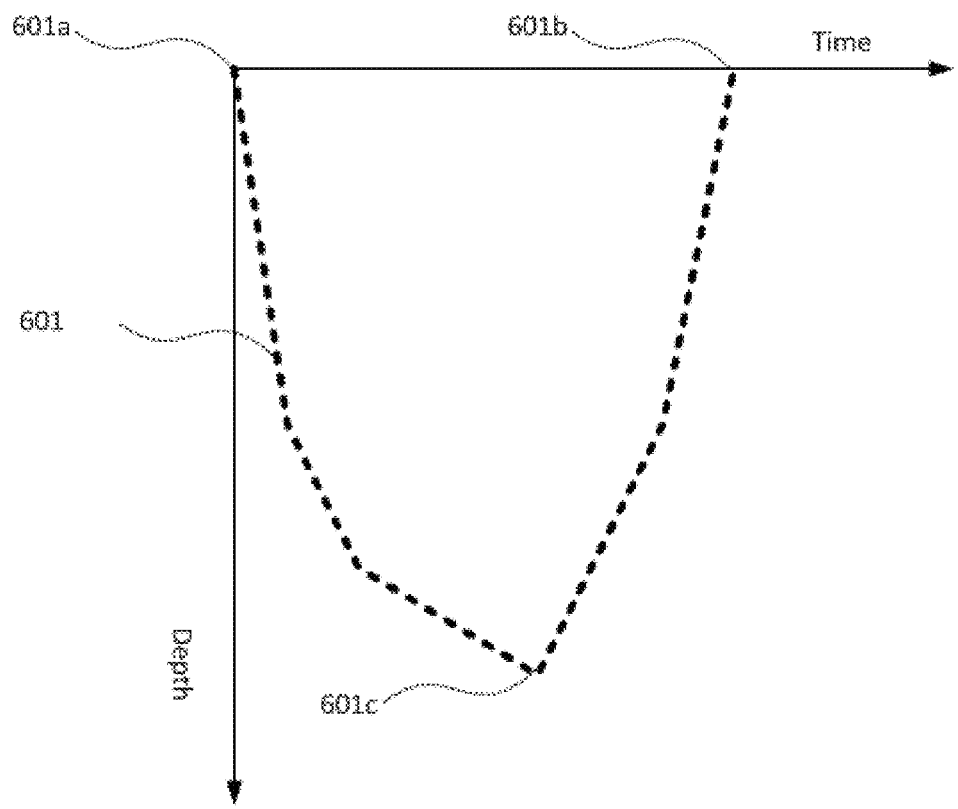
FIG. 6 is an exemplary graph of a time/depth curve for a run based on data obtained from time and depth sensors.

In preferred embodiments, all runs needed to create, secure and maintain a section are executed in sequence, and for each run, time and depth based sensor data are gathered. Referring to FIG. 6, each run can be plotted on a time/depth curve 601 time stamp for the start, t1 601a and end time t2 601b of the run. In addition, the run has been run to a maximum depth 601c at a time t3, in between t1 and t2. The run is further framed by the fact that it start and ends at the surface, i.e., depth zero. Therefore each run is uniquely defined within fixed frames of time and depth.

Figure 7:
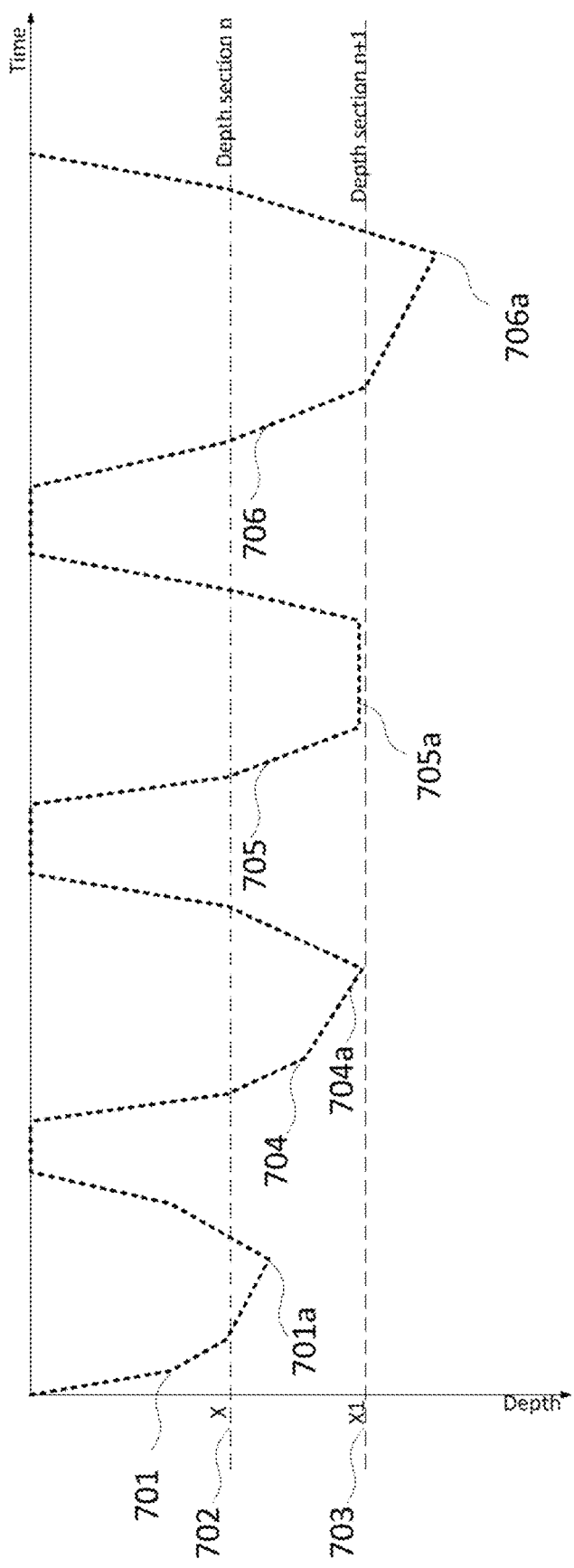
FIG. 7 is an exemplary graph of a series of time/depth curves for a plurality of sections and runs.

A section has a defined maximum depth from the well schematic. In some preferred embodiments, the maximum depth of a section and the maximum depth of the runs can be used to link the two. Referring the FIG. 7, consider a section n with a maximum depth of x m 702. The first run 701, with a maximum depth >x m 701a, therefore marks the start of the next section, n+1 that has the maximum depth of x1>x m 703. This first run 701 and subsequent runs 704 and 705, with depths 704a and 705a therefore belong to section n+1, until a run B has a maximum depth >x1, 706a, thus signaling the start of a new section n+2. The runs belonging to section n+2 is defined as the run reaching a depth >x1 and all subsequent runs, until a new section depth x2 are exceeded. This method is valid for all runs belonging to the generic section n+m.

In preferred embodiments, this relationship is used to uniquely link each run to a section, and to define the unique start and end time for a section, i.e., section n+1 starts at the start time of run 701, and ends at the start time of run 706. Using this method, both section and run maximum depth and start and end times can be uniquely defined.

In some preferred embodiments, the systems and methods of the present invention utilize time and depth based logs. As time and depth based logs are considered trajectory data, downhole sensor data, unit operational data and other data gathered that are of relevance for the operation and the wellbore. The relationship between time and depth based logs and the run is described above. In some preferred embodiments, all logs sampled between the start and end times of the run are associated with the run. Likewise, since the section start and end times can be derived from the start and end times of the runs used to create the section, the data collected between these two times will also be associated with the section created by the runs. However, since more than one run can be run in each section, multiple data series can exist for each depth of a section. In these cases, in preferred embodiments of the invention, only the data gathered from the first run recorded at any given depth within the section is associated with the section. For wellbore and wells, the data is the accumulation of data available for runs and sections.

Figure 8:
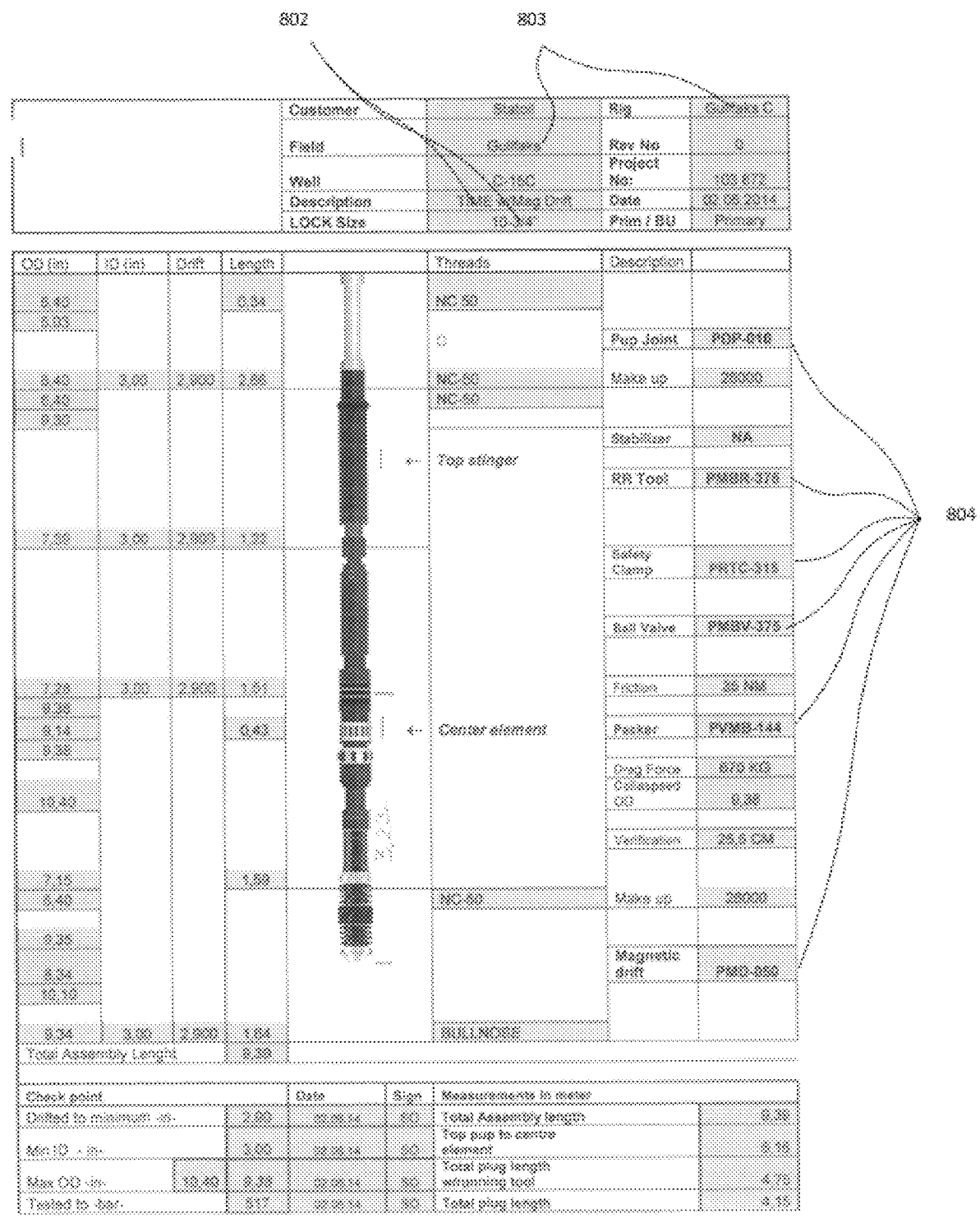
FIG. 8 is a depiction of an exemplary bottom hole assembly data file.

FIGS. 8 and 9 provide depictions of BHA and operating procedure files (i.e., data files). The BHA 801 is the configuration of tools needed to execute the run, and the operating procedures 901 are the activities that are needed to operate the tools in the run to achieve the objective of the run. The BHA schematic and the operating procedures are most often developed in Microsoft Word or Excel and stored in the archive as PDF documents. In some preferred embodiments, the linkage with the run real time data is the run UID 802 and 902 combined with the wellbore UID 803 and 903 which the invention will automatically assign as document metadata to the BHA and operational procedure documents.

Further, the BHA schematic contains product data information 804, that will uniquely identify the tools contained in the BHA (the Equipment UID described above), thus providing between the tool and the run. In some preferred embodiments, the systems and methods of the present invention utilize the tool identifying data included in the BHA schematic to link the product data and BHA schematic to the run.

Figure 10:
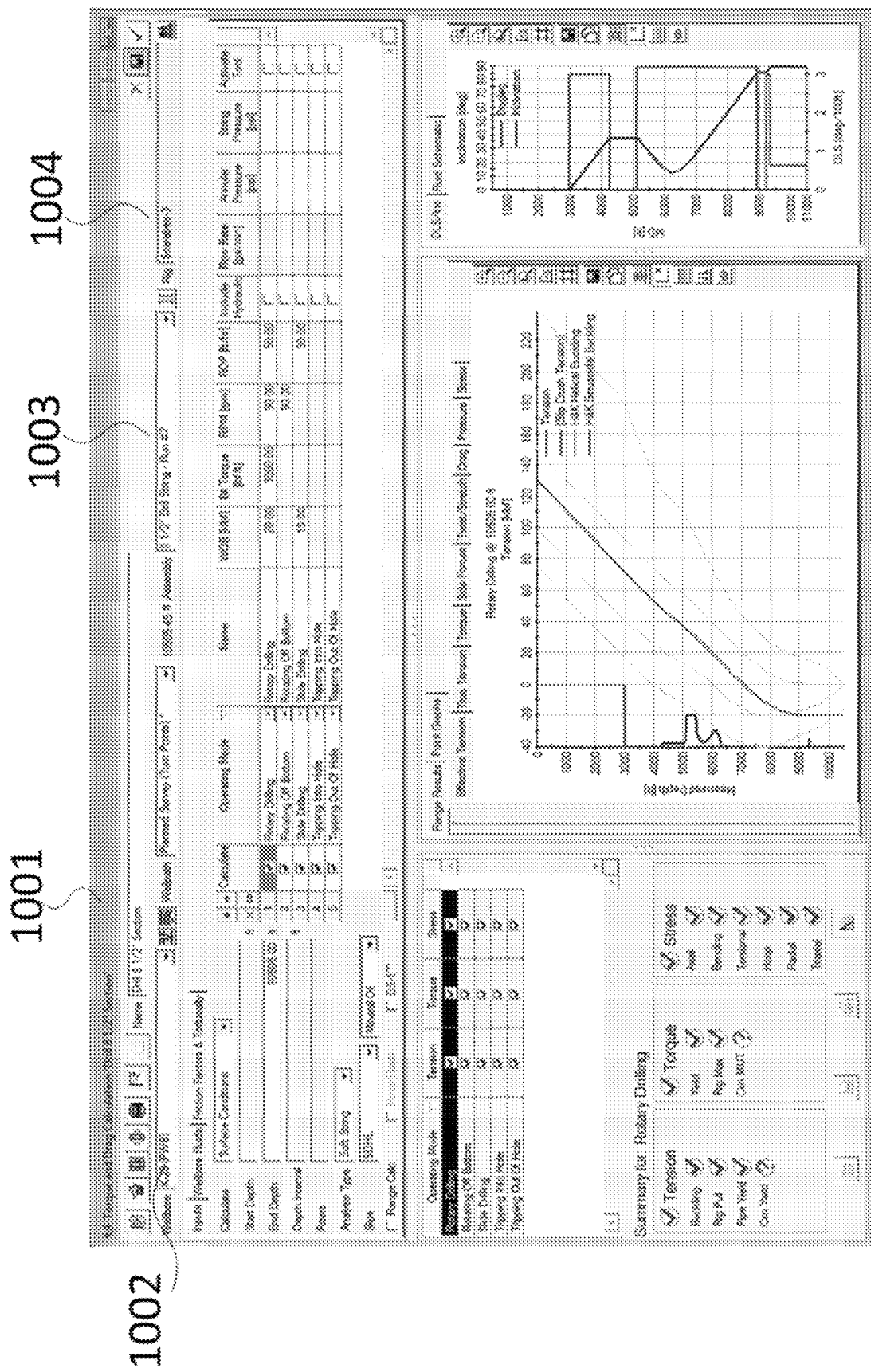
FIG. 10 is a depiction of an exemplary simulation file.

FIG. 10 provides a depiction of a simulation document or file 1001. Simulations of well operations are frequently generated and stored in special simulation computer programs. For some of these computer programs, the output of the simulations can be exported and stored in external data stores. Each simulation is performed in a wellbore, and section and run details are stored in the program. In some preferred embodiments, the present invention links or indexes the simulation data with wellbore UID 1002, run UID 1003 and Equipment UID 1004 as metadata to the simulations. In preferred embodiments of the invention, these metadata will link the simulations to the run.

Figure 11:
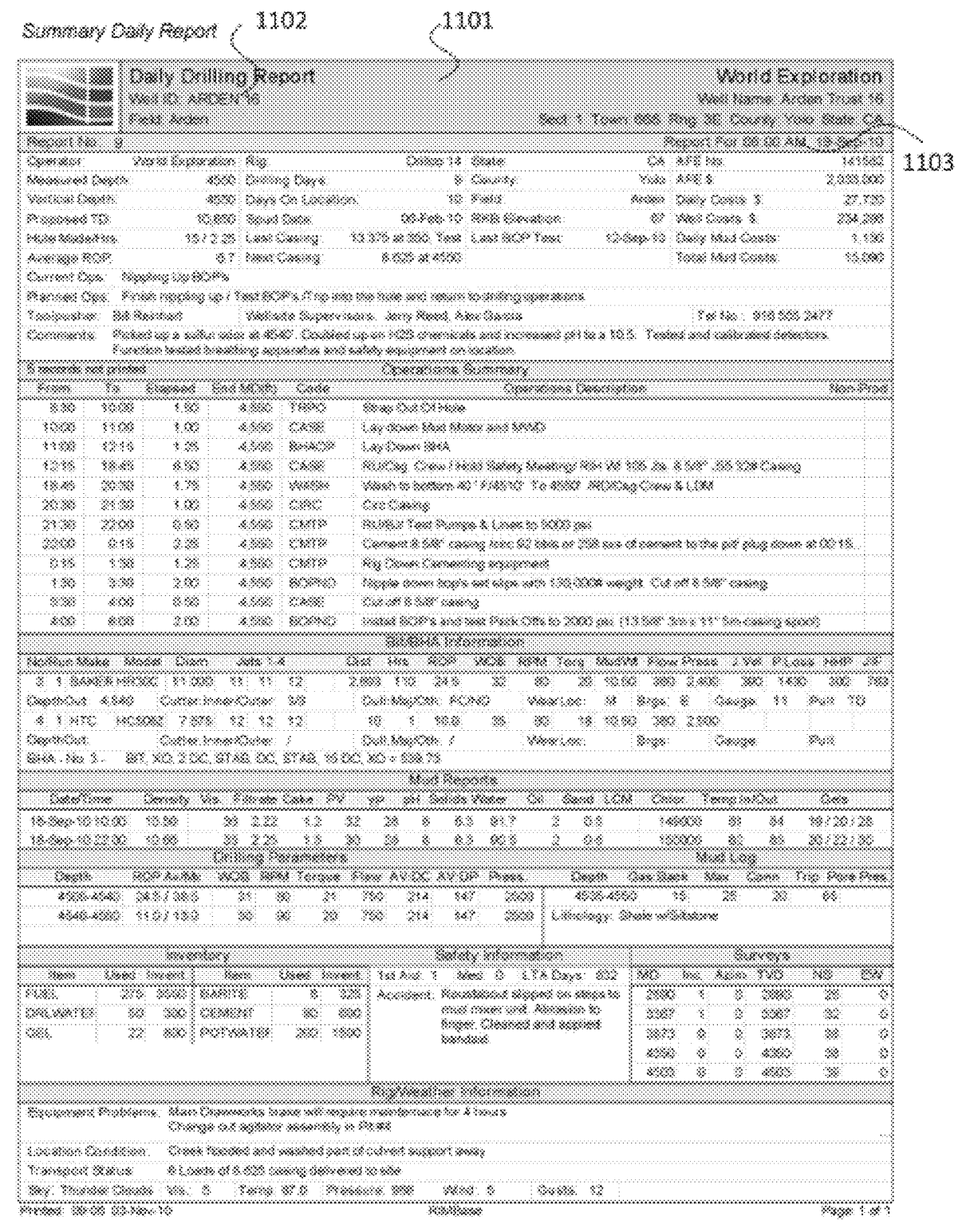

Referring to FIG. 11, reports related to wells and other operations can be automatically or manually generated and stored as xml or other formats, such as Microsoft Word, Excel or PDF. Typical reports include daily reports 1101, end of section reports, end of well reports and end of job reports for interventions. In preferred embodiments, these reports are wellbore 1102 specific. Daily reports are date stamped 1103, and in preferred embodiments the systems and methods of the present invention link or index these reports to runs via the report date and the run UID of the run having a start and end time that contains the report date. Section reports are prepared upon completion of a section, and the invention will allow these to be tied into the section via the section name and one or more of the wellbore UID and the section UID. The end of well reports are, in preferred embodiments of the invention, tied to the well via the well name, and end of job reports are tied to the well via wellbore UID, run UID and date.

System

Figure 12:
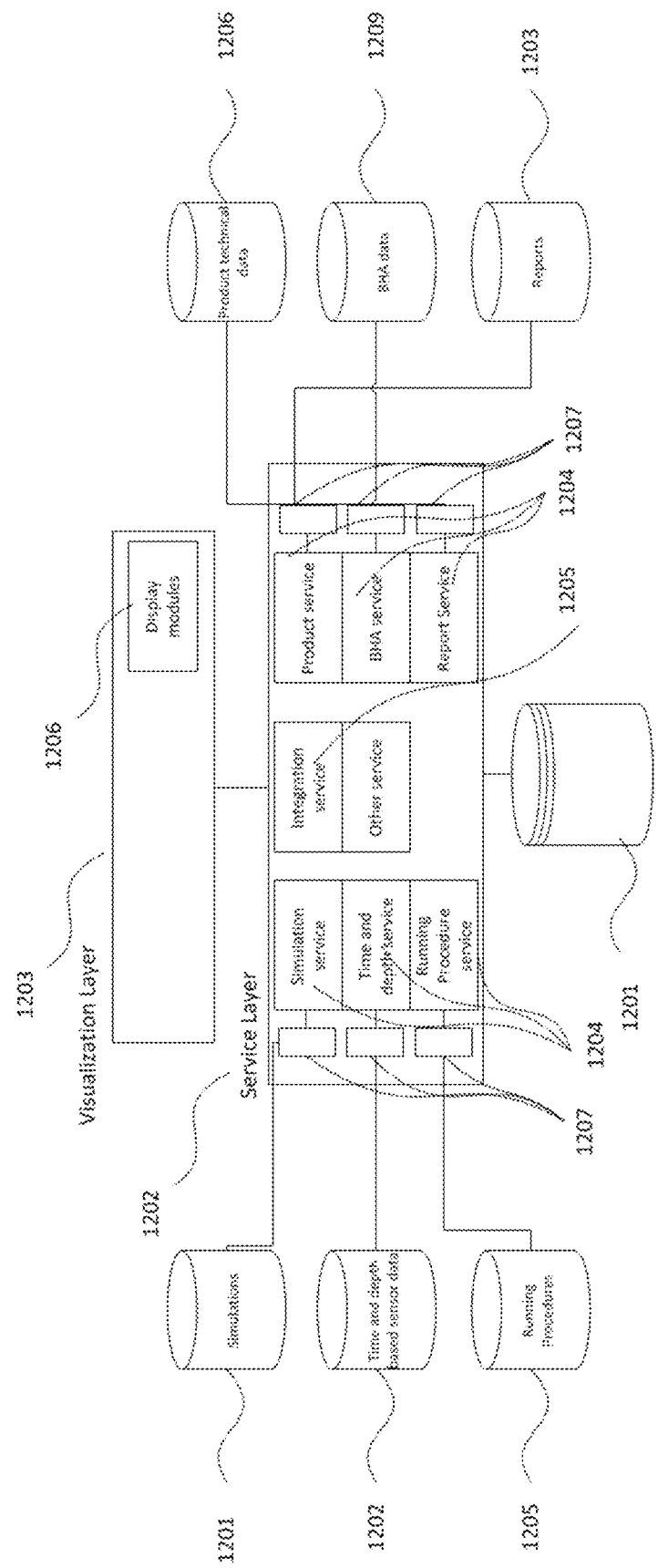
FIG. 12 is a schematic depiction of a system of the present invention including service and visualization layers.

Referring to FIG. 12, in some preferred embodiments, systems of the present invention comprise a database 1201, a service layer 1202 and a visualization layer 1203 set up to communicate with other datastores and to enable engineers to find, access and use archived information. In some preferred embodiments, the database of the invention stores the wellbore unique UID and other metadata, exemplified by one or more of the following: wellbore operator, field, region, spud and completion dates and well schematic data and section data. In addition, the datastore stores metadata associated with runs, reports, simulations, BHA schematics, operation procedure, equipment technical and maintenance data and runs via services 1204 towards the respective datastores 1201, 1202, 1203, 1205, 1206, and 1209. The relevant metadata for each of these information types are indexed, thus storing unique identifying metadata for each of the metadata types as discussed above with reference to FIG. 4, thus enabling the system to contact the host data store for each of these systems and retrieve the relevant information from the host data stores of the information. In case the data store of the invention and the host data store use different mnemonics, a mnemonic table 1207, establishing a common terminology between the data store of the invention and the data store(s) of other connected data stores.

In some preferred embodiments, the service layer 1202 comprises multiple services enabling communication between the data store of the invention, the host data stores for the various types of archived information and the user interface. Considering for example, the daily reports, for this information types, the service will retrieve the index information, associate the indexed data with relevant metadata, if not already present, another service 1205 will assign the daily reports to the relevant runs and sections and thus integrate this with the other data.

In some preferred embodiments, the visualization layer 1203 manages the user interface, presenting the various data made available via display modules 1206 and allows the user to effectively retrieve the data stores by user actions in the user interfaces. The visualization layer communicates with the service layer 1202, and initiates the services based on user actions.

User Interface

Figure 13:
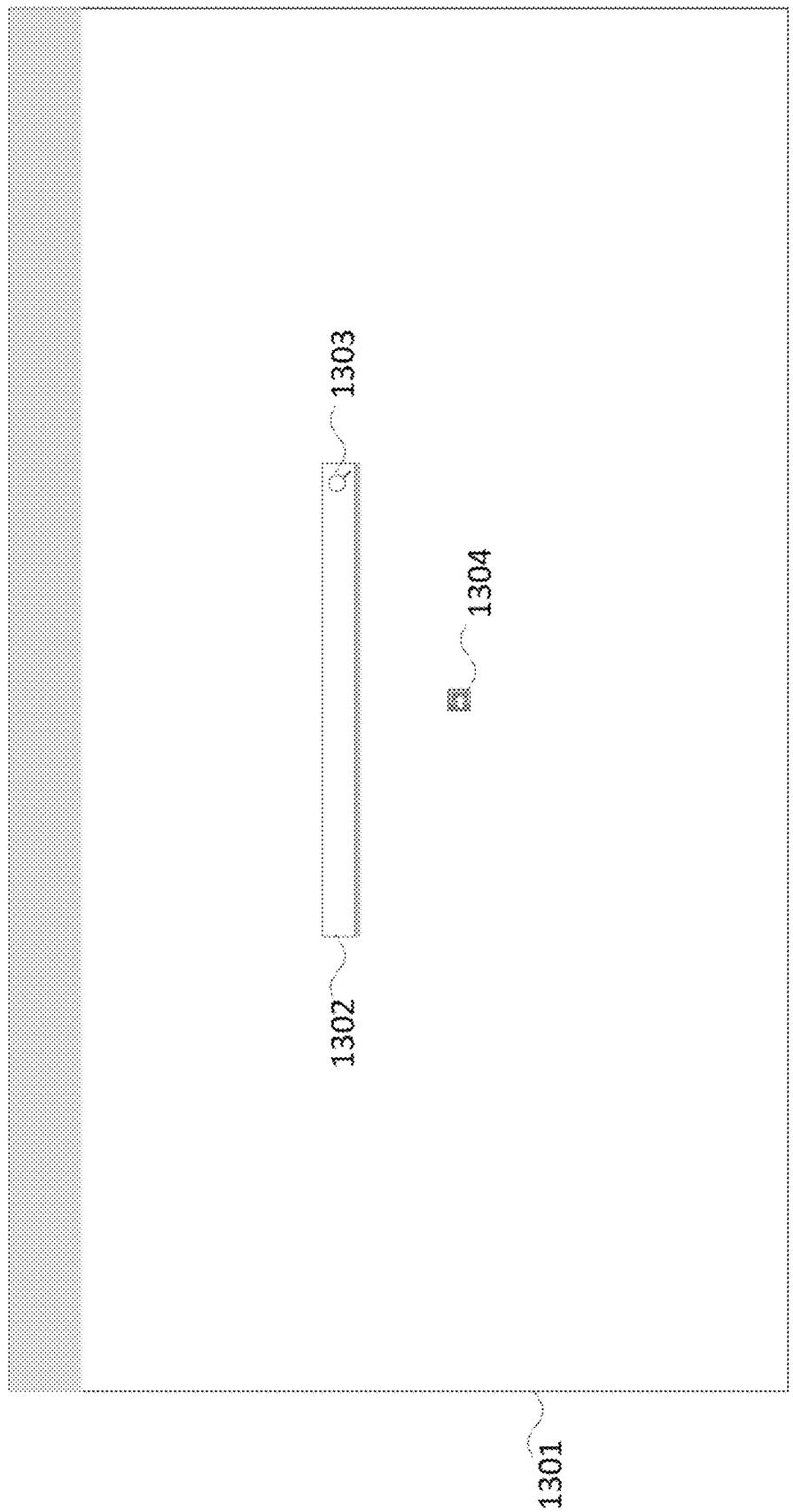
FIG. 13 is a screenshot of user search interface page of the present invention.
Figure 14:
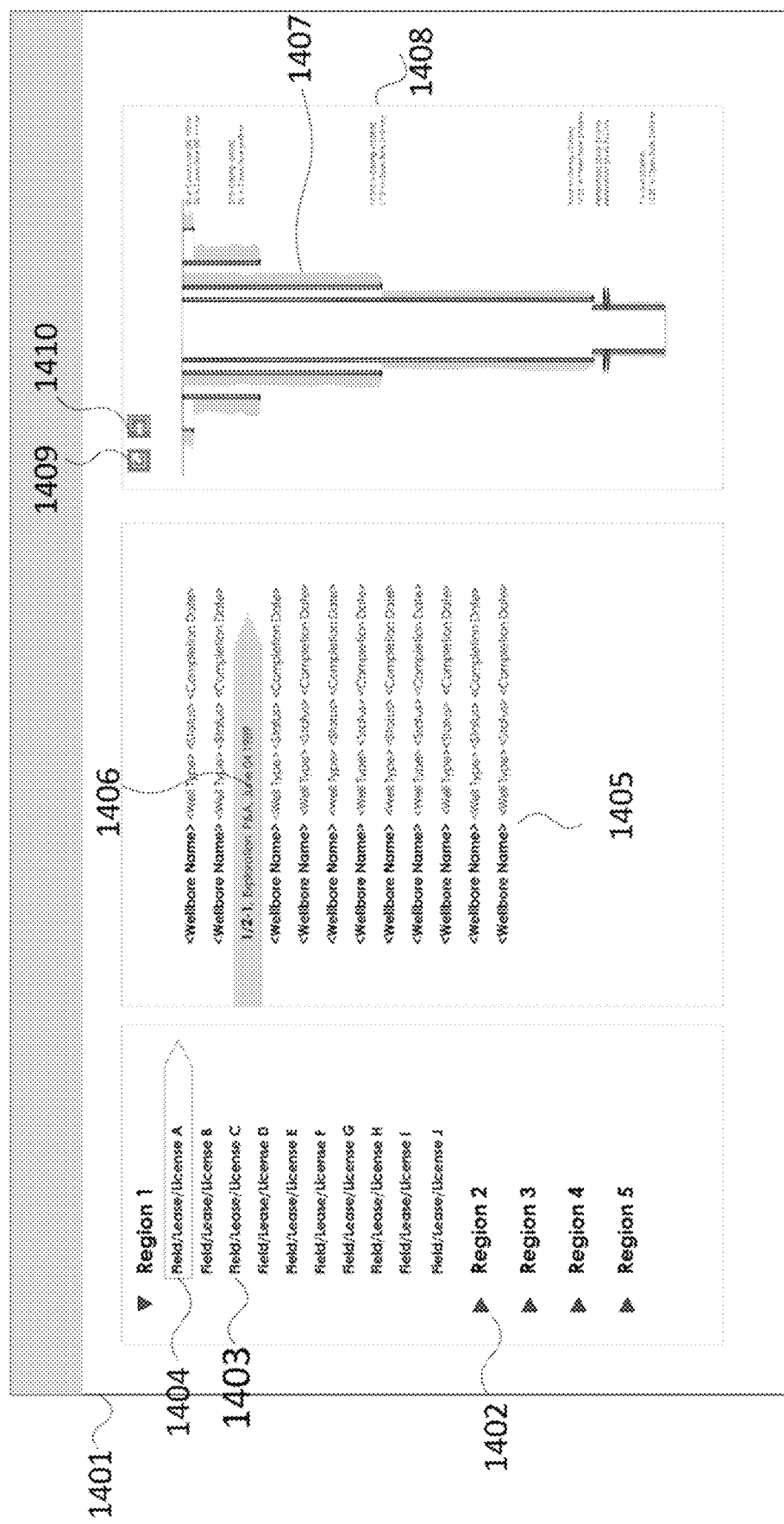
FIG. 14 is a screenshot of a search results page of the present invention.

Another aspect of the invention addresses the need for engineers to easily find the archived information in a user interface, which is a visual interpretation of the system. In some preferred embodiments, the invention makes information available in a web browser via two different methods, one being a search interface 1301 as depicted in FIG. 13, where users may search, 1302 for any character, being letters, numbers or other. In some preferred embodiments, the search field is labeled with a search symbol, 1303. By entering a search term in the search field 1302, a search result page 1401 will be displayed, an example of which if provided in FIG. 14. Additional search terms can be added 1402, to present a list of one or more search criteria 1403. The wellbores meeting all search criteria are presented in a list 1405. Search criteria can be removed via a symbol 1404. By selecting a well, this well be highlighted 1406, and will display the well schematic 1407 and a text description of the sections belonging to the well 1408. Detailed information on any selected well can be displayed in the same window be selecting a symbol 1409, and in a new window by selecting another symbol 1410.

Figure 15:
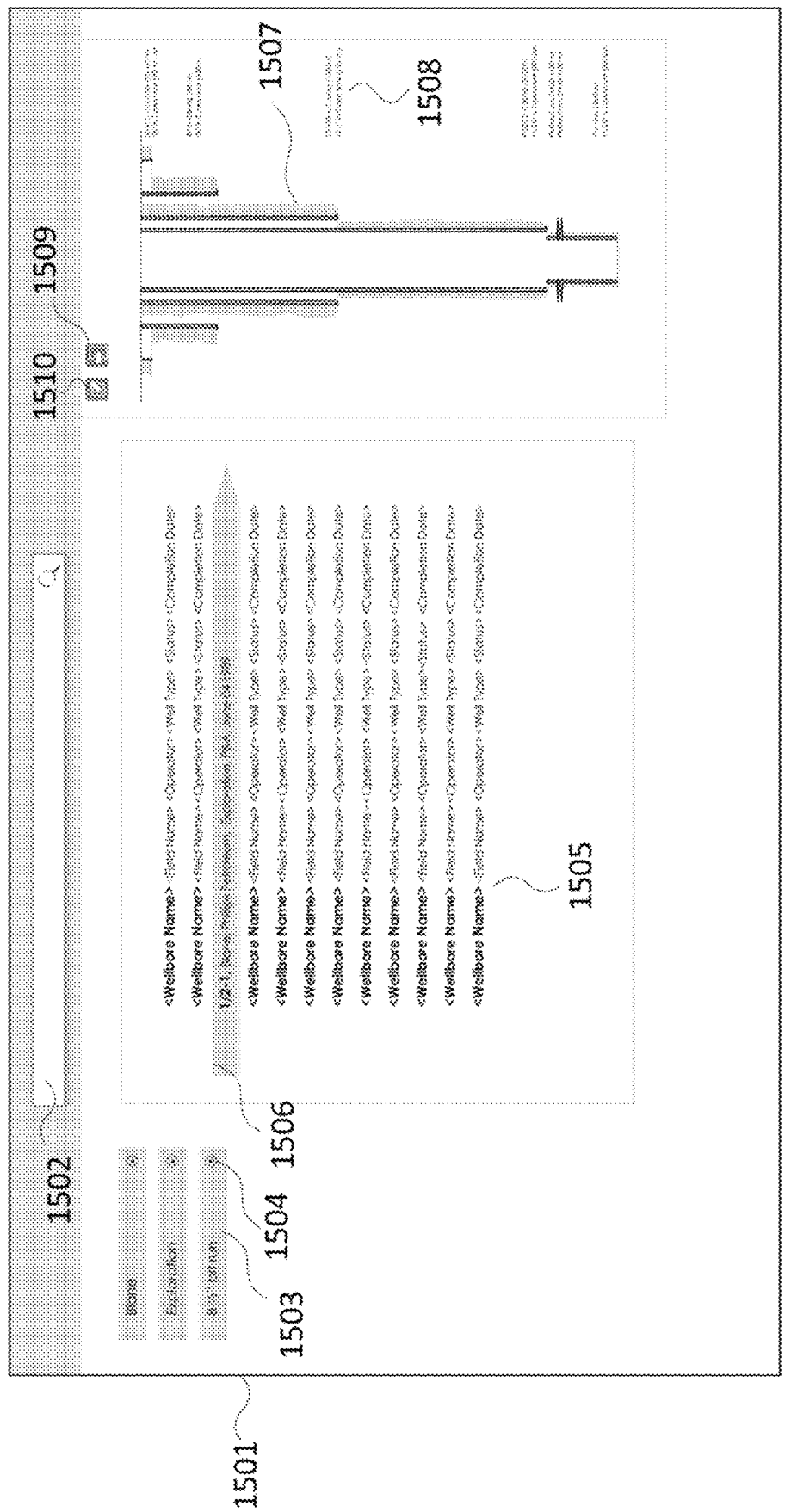
FIG. 15 is a screenshot of well archive page of the present invention.

In other preferred embodiments, the user interface is an organized archive 1501 as shown in FIG. 15, that are accessed from the search page via a designated symbol 1304 as depicted in FIG. 13. In some preferred embodiments, the organized archive has the archived information sorted by region 1503, which can be expanded to a list of fields 1503 belonging any given region, selecting a field 1504, the wells drilled on this field will be shown. In some preferred embodiments, selecting a well 1506 will display the well schematic 1507 and a text description of the sections belonging to the well 1508. In some preferred embodiments, detailed information on any selected well can be displayed in the same window be selecting a symbol 1509, and in a new window by selecting another symbol 1510.

Figure 16:
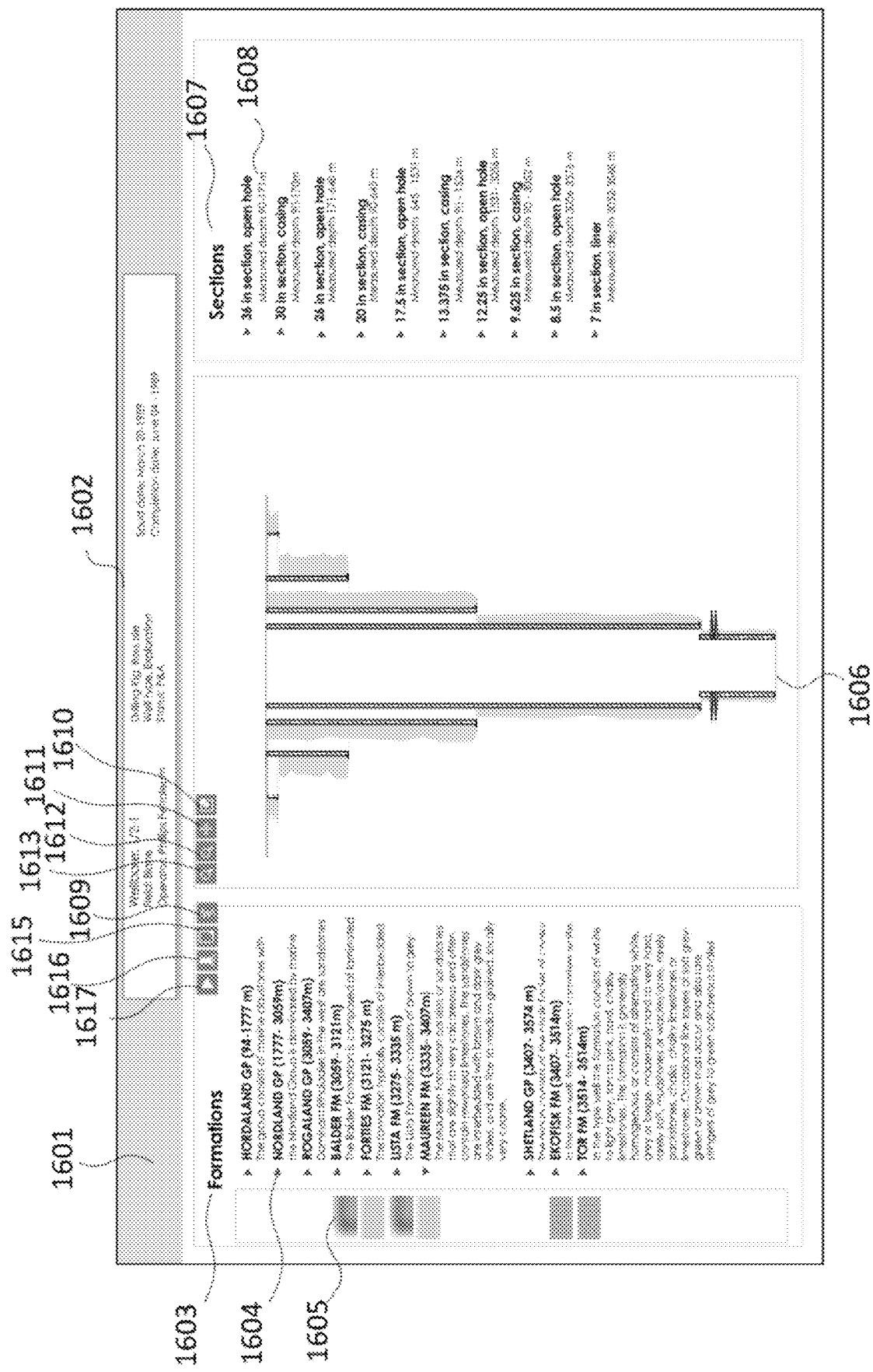
FIG. 16 is a screenshot of well page of the present invention.

Referring to FIG. 16, in some preferred embodiments, a well page 1601, which is opened from the search interface 1301 (see FIG. 13) or the archive page 1501 (see FIG. 15) and contains wellbore name and associated metadata 1602. In some preferred embodiments, the interface also contains a formations section 1603, containing a list of formations penetrated by the well 1604 and an associated symbol for the formations 1605. In some preferred embodiments, the interface also provides a well schematic diagram 1706, and a list of the sections of the wellbore 1607 and 1608. The symbol 1610 allows the well schematic diagram 1606 to be expanded into a new window. The symbols 1611, 1612, and 1613 allow zoom out, zoom in and pan, respectively, of the well schematic diagram.

In some preferred embodiments, the archived information on the well is available via user action on symbols. Symbol 1609 allows the display of time and depth based data, symbol 1615 allows the display of reports, symbol 1616 allows display of BHA schematics and symbol 1617 display of simulations.

Figure 17:
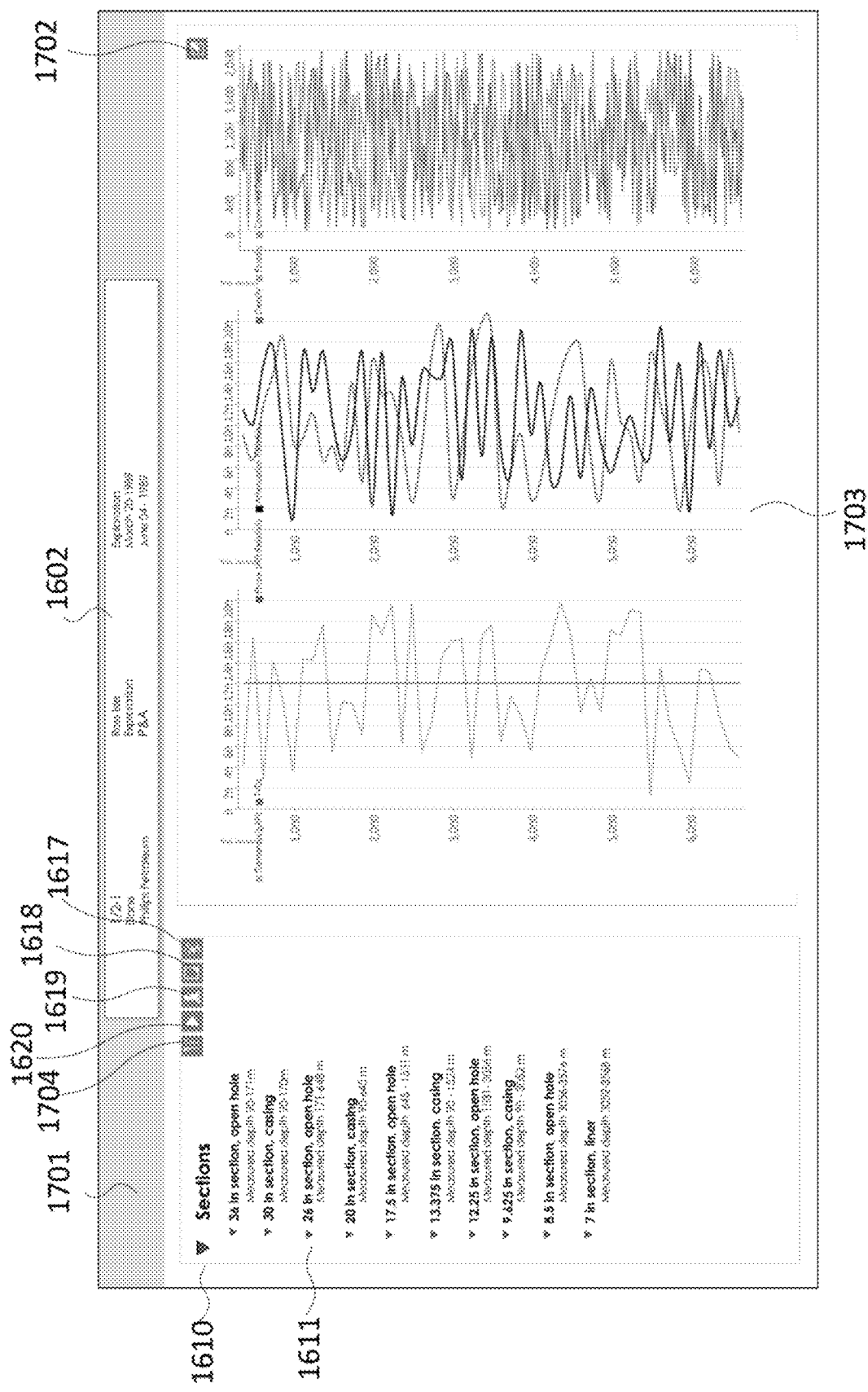
FIG. 17 is a screenshot of well page of the present invention with a log view displayed.

In some preferred embodiments, upon selecting to view time and depth based data via the log-view symbol 1609, referring to FIG. 17, these data are displayed within the well page frame 1701 as logs 1703. The log view can be expanded into a separate window via the symbol 1702. The symbol 1704 enables return to the well page.

Figure 18:
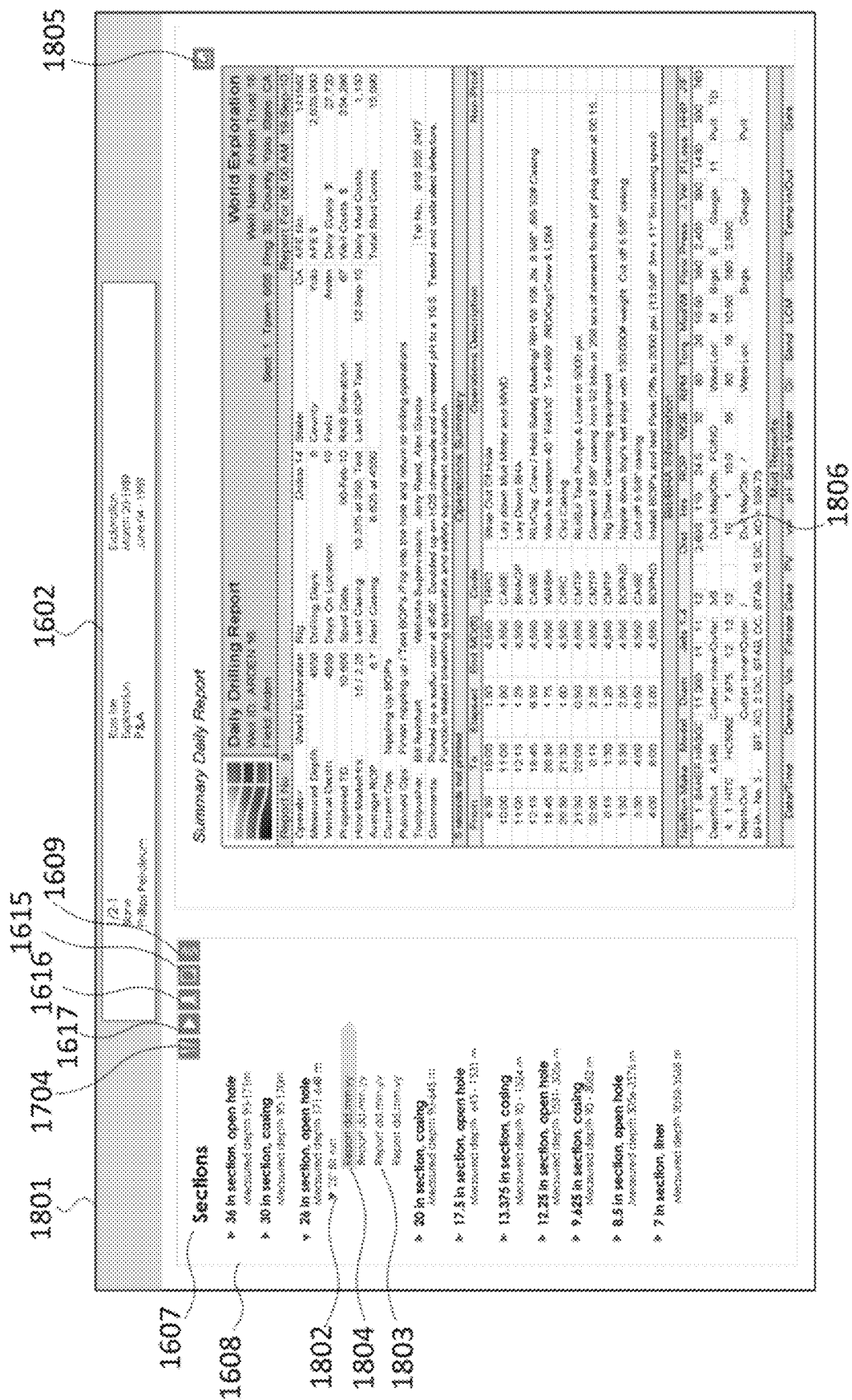
FIG. 18 is a screenshot of well page of the present invention with an expanded section list displayed.

Referring again to FIG. 16, within the section list 1607, each section 1608 can be expanded to, referring to FIG. 18, list the runs 1802 used to create the section, as well as listing the daily reports 1803 for each day of reported operations for the runs in question, by selecting a report on a daily 1804 or section 1608 level in FIG. 16, the selected report is opened within the well page 1806. The symbol allows the report 1805 to be opened in a separate window via the symbol 1615 in FIG. 16.

Figure 19:
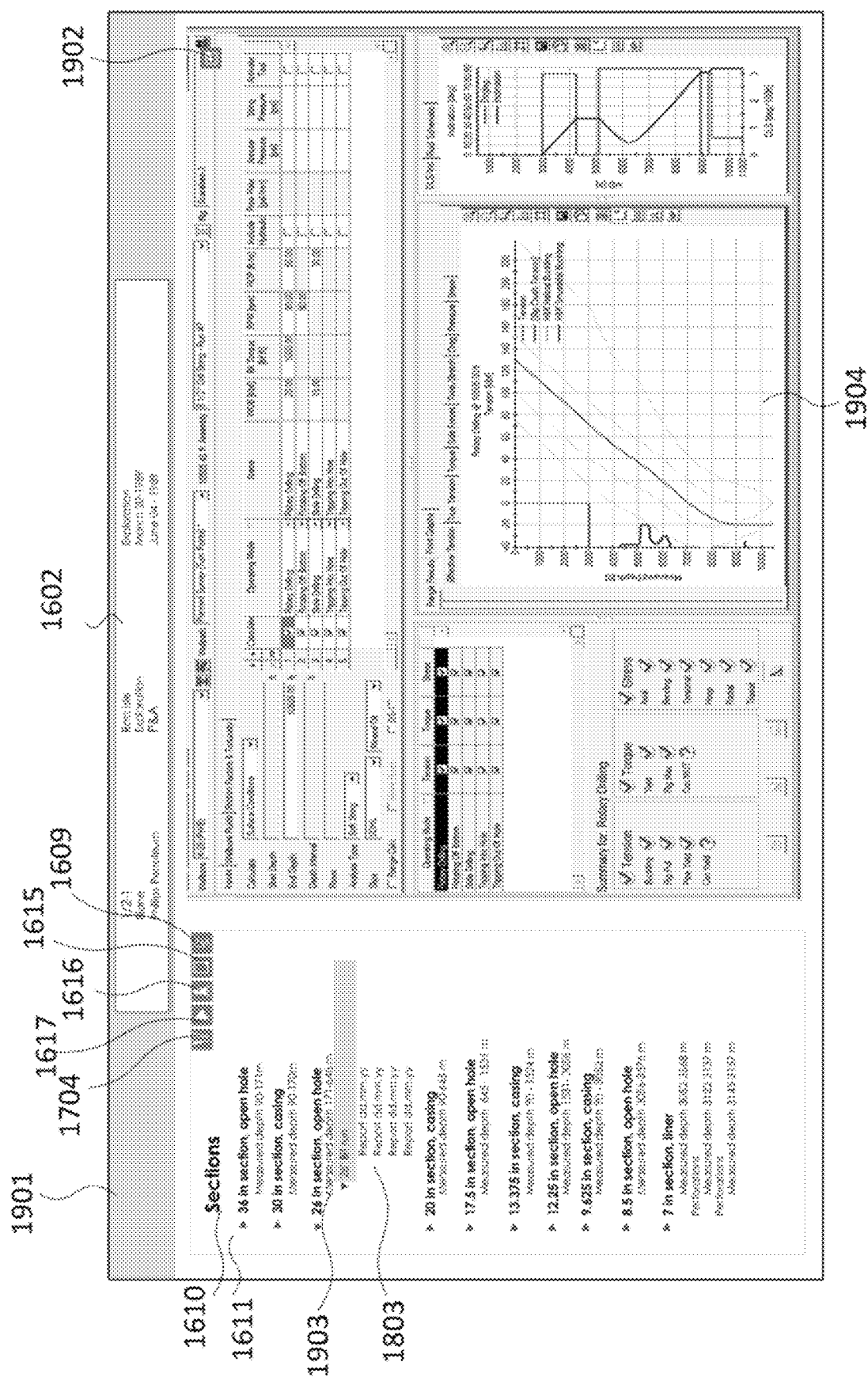
FIG. 19 is a screenshot of well page of the present invention with a simulation display.

Within the Section List, 1607 in FIG. 16, selecting the run 1708 and the symbols for simulation 1717 or BHA 1716, the selected information are displayed with the well page 2004, here exemplified in FIG. 19 via simulation display 1904.

The invention claimed is:

1. A method for archiving oil well information for an oil well comprising multiple sections, said method comprising:
receiving, at a central computer server, oil well data for a specific oil well from one or more remote computers/servers located at a site remote from the central server, the oil well data comprising oil well schematics;
extracting oil well schematic metadata from the oil well schematics, the oil well schematic metadata comprising one or more of: section size, section depth, bit run data and casing run data for each section;

creating a well bore unique identifier from the oil well schematic metadata for each section to uniquely identify the well;

receiving, at the central computer server, well run data for the well;

extracting well run metadata from the well run data, the well run metadata comprising one or more of: maximum depth for a run, start time for the run, and end time for the run, wherein the well run metadata is associated with drilling for each section;

creating a run unique identifier from the well run metadata to uniquely define each run for the well;

receiving additional oil well data files for the well from one or more remote servers, the additional oil well data files selected from the group consisting of: oil well schematics, bottom hole assembly data, product technical data, oil well running procedures, drilling simulations, time and depth based sensor data, oil well reports, and combinations thereof;

indexing, at the central server, one or more of the additional well data files with metadata comprising one or both of the well bore unique identifier and run unique identifier to provide a database of indexed files associated with one or more oil wells;

creating an equipment unique identifier; and generating a request for metadata via a processor associated with the central server and transmitting the request for metadata to one or more remote servers/computers, wherein a response to the request is indexed within the central server with one or more of the well bore unique identifier, the run unique identifier and the equipment unique identifier.

2. The method of claim 1, wherein creating an equipment unique identifier further comprises:

receiving, at the central computer server, a bottom hole assembly schematic;

extracting metadata from the bottom hole assembly schematic comprising equipment type metadata;

creating an equipment unique identifier from the equipment type metadata; and indexing, at the central server, one or more of the additional well data files with metadata comprising the equipment unique identifier alone or in combination with the well bore unique identifier and the run unique identifier to provide a database of indexed files associated with the one or more oil wells.

3. The method of claim 1, wherein the response is selected from the group consisting of: daily reports, end of section reports, end of well reports, and end of job reports for interventions.

4. The method of claim 1, further comprising providing a user interface accessible from a remote location via a web browser, the user interface comprising a search function allowing users to search the database of indexed files associated with one or more oil wells.

5. The method of claim 4, wherein upon execution of a search via the search function, oil wells meeting search criteria are displayed on a search interface.

6. The method of claim 5, wherein upon selecting an oil well displayed on the search interface causes display on the user interface, on a same page or on a new well page, of one or more of: the well schematic, a bottom hole assembly schematic, and a text description of a section associated with the a well, and indexed by one or more of the well bore unique identifier, the run unique identifier and the equipment unique identifier.

7. The method of claim 6, wherein the user interface display comprises selectable symbols, selection of which by a user causes display of one or more of the well schematic, the bottom hole assembly schematic, the text description of the section, a list of formations penetrated by the well, well reports, time and depth data, and simulation data.

8. The method of claim 1, further comprising providing an organized archive accessible from a search interface via a designated symbol, said organized archive comprising files indexed by one or more of the well bore unique identifier, the run unique identifier and the equipment unique identifier.

9. The method of claim 8, wherein archived information is accessed by a first list designating a plurality of regions, each of which is expandable to a second list of fields within the selected region, wherein the second list of fields within the selected region is expandable to a list of wells drilled in the field.

10. The method of claim 9, wherein selection of the well from the list of wells drilled in the field causes display, by the user interface, of one or more of: the well schematic, the bottom hole assembly schematic, and the text description of the section associated with the well and indexed by one or more of the well bore unique identifier, the run unique identifier and the equipment unique identifier.

11. The method of claim 10, wherein the user interface comprises selectable symbols, selection of which by a user causes display of one or more of: the well schematic, the bottom hole assembly schematic, the text description of the section, the list of formations penetrated by the well, the well reports, the time and depth data, and the simulation data.

12. A system comprising:

a database comprising a plurality of oil well data files from remote sources, the oil well data files indexed with metadata selected from the group consisting of:

a well bore unique identifier created from oil well schematic metadata comprising one or more of section size, section depth, bit run data and casing run data for each section, a run unique identifier created from well run metadata comprising one or more of maximum depth for a run, start time for the run, and end time for the run, wherein the well run metadata is associated with drilling for each section, an equipment unique identifier created from equipment type metadata from a bottom hole assembly schematic, and combinations thereof;

wherein individual oil well data files selected from the group consisting of: oil well schematics, bottom hole assembly data, product technical data, oil well running procedures, drilling simulations, time and depth based sensor data, oil well reports, and combinations thereof from a particular oil well are uniquely indexed to the particular well based on one or more of the well bore unique identifier, the run unique identifier and the equipment unique identifier; and a user interface at a remote location allowing access to the database via a web browser, the user interface comprising a search function allowing users to search the database of indexed files associated with one or more oil wells;

wherein upon execution of a search via the search function, wells meeting search criteria are displayed on a search interface; and wherein upon selecting a specific oil well displayed on a search interface causes display on the user interface of one or more a well schematic, bottom hole assembly schematic, and text description of a section associated with the specific oil well and indexed by one or more of the well bore unique identifier, the run unique identifier and the equipment unique identifier.

13. The system of claim 12, wherein the user interface comprises selectable symbols, selection of which by a user causes display for the specific oil well, of one or more of: the well schematic, bottom hole assembly schematic, section description, list of formations penetrated by the well, well reports, time and depth data, and simulation data.

14. The system of claim 12, further comprising an organized archive accessible from the search interface via a designated symbol, said organized archive comprising files indexed by one or more of the well bore unique identifier, the run unique identifier and the equipment unique identifier, wherein the archived information is accessed by a first list designating a plurality of regions, each of which is expandable to a second list of fields within a selected region.

15. The system of claim 14, wherein the second list of fields within the selected region is expandable to a list of wells drilled in a selected field.

16. The system of claim 12, further comprising a service layer, wherein the service layer comprises a central server/computer that:
   receives the oil well data files for the particular oil well from one or more remote computers/servers located at a site remote from the central server, the oil well data files comprising oil well schematics;
   extracts the oil well schematic metadata from the oil well schematics, the oil well schematic metadata comprising one or more of section size, section depth, bit run data and casing run data for each section;
   creates the well bore unique identifier from the oil well schematic metadata for each section to uniquely identify the section;
   receives the well run data;
   extracts the well run metadata from the well run data, the well run metadata comprising one or more of maximum depth for the run, start time for the run, and end time for the run, wherein the well run metadata is associated with the drilling for each section;
   creates the run unique identifier from the well run metadata to uniquely define each run for the particular oil well;
   receives the additional oil well data files for the particular oil well from one or more remote servers, the additional oil well data files selected from the group consisting of: oil well schematics, bottom hole assembly data, product technical data, oil well running procedures, drilling simulations, time and depth based sensor data, oil well reports, and combinations thereof; and
   indexes one or more of the additional oil well data files with metadata comprising one or both of the well bore unique identifier and run unique identifier to provide the database of indexed files associated with the one or more oil wells.

17. The system of claim 16, wherein the service layer further:
   receives a bottom hole assembly schematic;
   extracts metadata from the bottom hole assembly schematic comprising equipment type metadata;
   creates an equipment unique identifier from the equipment type metadata;
   and indexes one or more of the additional well data files with metadata comprising the equipment unique identifier alone or in combination with the well bore unique identifier and the run unique identifier to provide the database of indexed files associated with the one or more oil wells.

* * * * *